(12) United States Patent
Hale et al.

(10) Patent No.: US 11,673,187 B2
(45) Date of Patent: Jun. 13, 2023

(54) METHOD AND APPARATUS FOR MONITORING A CONTINUOUS STEEL CASTING PROCESS

(71) Applicant: HERAEUS ELECTRO-NITE INTERNATIONAL N.V., Houthalen (BE)

(72) Inventors: Ben Hale, Chesterfield (GB); Philip Hughes-Narborough, Chesterfield (GB); Mark Lee, Chesterfield (GB); Stephen Pagden, Chesterfield (GB)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 144 days.

(21) Appl. No.: 16/963,415

(22) PCT Filed: Dec. 19, 2018

(86) PCT No.: PCT/EP2018/085874
§ 371 (c)(1),
(2) Date: Jul. 20, 2020

(87) PCT Pub. No.: WO2019/166121
PCT Pub. Date: Sep. 6, 2019

(65) Prior Publication Data
US 2021/0362222 A1 Nov. 25, 2021

(30) Foreign Application Priority Data
Feb. 28, 2018 (EP) .................................. 18159119

(51) Int. Cl.
*B22D 11/18* (2006.01)
(52) U.S. Cl.
CPC .................. *B22D 11/182* (2013.01)

(58) Field of Classification Search
CPC ........ B22D 11/18; B22D 11/182; B29C 39/44
(Continued)

(56) References Cited

U.S. PATENT DOCUMENTS 4,469,162 A    9/1984 Hanas et al.
6,539,273 B1 * 3/2003 Pleschiutschnigg et al. ...............
                                               B22D 11/20
                                                   164/451

FOREIGN PATENT DOCUMENTS

CN    1258415 C    6/2006
CN    102896289 A    1/2013
(Continued)

OTHER PUBLICATIONS

International Search Report issued in PCT/EP2018/085874 dated Apr. 1, 2019.
European Search Report Issued in EP18159119 dated May 25, 2018.

*Primary Examiner* — Kevin P Kerns
(74) *Attorney, Agent, or Firm* — Blank Rome LLP

(57) ABSTRACT

A method, an apparatus and a computer readable-medium for monitoring a continuous steel casting process where molten steel is poured from a ladle into a tundish to be transferred through an exit nozzle into a mold. The method includes obtaining a critical superheat temperature value for the molten steel; measuring temperature values of the molten steel over a time period; determining superheat temperature values corresponding to the measured temperature values by comparing the measured temperature values with a liquidus temperature of the molten steel; and predicting a forecast time instance when the critical superheat temperature value is reached.

19 Claims, 5 Drawing Sheets

(58) Field of Classification Search
USPC ....... 164/449.1, 450.3, 154.7, 451, 452, 453
See application file for complete search history.

(56) References Cited

FOREIGN PATENT DOCUMENTS

| | | |
|---|---|---|
| CN | 103276147 A | 9/2013 |
| CN | 106141132 A | 11/2016 |
| CN | 106825469 A | 6/2017 |
| EP | 1614489 A1 | 1/2006 |
| EP | 1757915 A1 | 2/2007 |
| EP | 2399106 A2 | 12/2011 |
| EP | 2639562 A2 | 9/2013 |
| JP | H06246404 A | 9/1994 |
| JP | H06246406 A | 9/1994 |
| JP | H09253812 A | 9/1997 |
| JP | 2004098127 A | 4/2004 |
| JP | 2012161820 A | 8/2012 |
| WO | WO-2016108762 A1 | 7/2016 |

\* cited by examiner

METHOD AND APPARATUS FOR MONITORING A CONTINUOUS STEEL CASTING PROCESS

CROSS REFERENCE TO RELATED APPLICATIONS

This application is a national stage of International Patent Application No. PCT/EP2018/085874, filed Dec. 19, 2018, which claims the benefit of European Application No. 18159119.9, filed Feb. 28, 2018, each of which are incorporated by reference herein in their entirety.

FIELD OF THE INVENTION

The invention relates to a method for monitoring a continuous steel casting process where molten steel is poured from a ladle into a tundish to be transferred through an exit nozzle into a mold. The invention also relates to an apparatus and a computer-readable medium comprising a computer program comprising instructions for influencing a processor to carry out the method according to the invention.

BACKGROUND OF THE INVENTION

In the steelmaking process, steel is cast in continuous casting installations. These installations have a tower that allows to switch ladles, a tundish and a mold part, respectively multiple molds. The molten steel is transferred from the ladle into the tundish and from the tundish into the mold. The tundish is used as a distribution and buffer vessel. The tundish distributes the molten steel to different molds. In general, the tundish serves as a buffer which allows switching an empty ladle for the next ladle to be cast, i.e. without interrupting the casting in the mold. After a ladle switch, the steel coming out of the newly opened ladle is mixed with the remaining steel in the tundish. This mixing relates to both composition and temperature of the liquid steel.

Therefore, there are often differences in temperatures and compositions of the steel in the ladles. Some steel plants apply a complex model that predicts the temperature loss of the liquid steel in the total process. The model may have several input parameters such as expected time to casting, quality of the ladle lining, thermal condition of the ladle, level of alloying needed for the grade, treatment time etc.

The casting speed of the continuous steel casting process is determined based on the desired grade of the steel, the superheat of the liquid steel, and the dimensions of the mold. This results in a controlled casting speed linked to the superheat of the liquid steel in the tundish. This knowledge generates a list of preset values of minimum allowed superheat values, linked to different grades and installations. The superheat can be determined based on the temperature of the liquid steel in the caster and a corresponding liquidus temperature. The temperature can be measured by means of dipping thermocouples, continuous temperature measuring devices immersed from the top of the tundish, or built-in devices that are mounted through the side-wall or the bottom portion of the tundish such as described, for example, in EP1614489A1, EP2399106A2, EP1757915B1, and EP2639562B1.

The liquidus information can be obtained by means of calculation based on the composition of the grade specification, the composition known from the last analyzed sample, or can be obtained by means of an actual measuring device for measuring the liquidus temperature, such as for example by means of the device that is described in WO2016108762A1.

Every grade and installation has an upper and a lower limit linked to its superheat. In case the superheat exceeds the upper limit, the casting becomes too slow and it becomes difficult to adjust to the right casting speed. There exists a risk of break-out, often in the bending part. In case the superheat becomes too low, the temperature in the mold becomes too low and the required lubrication coming from the mold powder is no longer effective. In a worst case the tundish might freeze. The cost associated with production loss and repair caused by break-outs or freezing can be very high. Therefore, it is crucial to closely monitor the superheat of the liquid steel during the steel casting process. For example, in case the superheat drops close to its lower limit, the continuous casting process might be stopped, avoiding damages to the casting installation. Alternatively, an early ladle change can be made for being able to continue the casting process. Problems with uncontrolled superheat are more likely to occur in case of longer ladle-to-ladle times and/or in cases of unplanned delays. These castings may have to start with a higher superheat and might end with a low superheat.

For avoiding break-outs and shutdowns for repair, U.S. Pat. No. 6,539,273B1 describes a method and apparatus for controlling the casting speed based on the superheat. Thus, U.S. Pat. No. 6,539,273B1 describes a scheme for directly interfering with the casting process based on measured values. However, there still exists a need for efficient monitoring techniques of continuous steel casting processes.

Therefore, the invention aims at providing an improved method for monitoring a continuous steel casting process that is based on fewer input parameters and assumptions than the methods known from the prior art, and which gives the operator sufficient time to prepare adequate measures in case of a foreseeable low superheat condition.

SUMMARY OF THE INVENTION

The invention provides a method for monitoring a continuous steel casting process where molten steel is poured from a ladle into a tundish to be transferred through an exit nozzle into a mold, comprising the steps:

obtaining a critical superheat temperature value for the molten steel;

measuring temperature values of the molten steel over a time period;

determining superheat temperature values corresponding to the measured temperature values by comparing the measured temperature values with a liquidus temperature of the molten steel; and predicting a forecast time instance when the critical superheat temperature value is reached.

In the context of this invention, the term 'continuous steel casting process' can be used to refer to a casting process where several ladles of molten steel are subsequently poured into the tundish, but might be also used to refer to a casting process or part of a continuous casting process where just one ladle of molten steel is poured into the tundish.

The term 'critical superheat temperature' is used herein to refer to a superheat temperature value that is considered the lowest superheat temperature value that still allows continuous casting without the adverse effects caused by superheat temperatures that are too low, such as freezing. Lower superheat temperatures are known to be the cause of most casting problems.

The superheat temperature, $T_{SH}$, in steelmaking can be defined as the difference between a temperature value of the molten steel, $T_M$, and the liquidus temperature of the molten steel, $T_L$, and can be calculated by the equation:

$$T_{SH}=T_M-T_L$$

$T_L$ is a function of the steel composition, and can be seen as an essentially constant value, however $T_L$ can vary within a range of approximately +/−10° C. from heat to heat during the continuous casting process, dependent upon the breadth of compositional variation allowed for a particular grade. The term 'heat' is used herein to refer to the content of a ladle. $T_L$ can be calculated from steel composition using models developed for the purpose, or derived through research into thermodynamic properties of steel alloys.

$T_M$ can be measured by a pyrometer located in the tundish, and usually varies by several ° C. during casting, dependent upon the actual process applied to the steel being cast.

The term 'predicting' is used herein to refer to the prediction of a future superheat value and to a time instance linked to the superheat value, i.e. to an event in the future when the superheat temperature will have dropped to the critical superheat temperature value.

A mathematical and/or computational method and/or model can be employed for the prediction. The prediction can be done with the determined superheat temperature values as only input parameter. However, in examples of the invention further input can be utilized. The method and/or model can be re-initialized and repeated after each ladle change.

Advantageously, the invention provides an easy to use interface for operators. The method according to the invention prevents 'end of casting' events linked to low superheat, e.g. freezing or poor casting powder lubrication. Also, the method according to the invention provides an overall view on the remaining safe time for the casting process, thus, generating additional time to prepare adequate actions if the critical superheat is reached during the casting process.

In one example, the method comprises:
obtaining a remaining time span for casting; and
determining whether the forecast time instance is within the remaining time span.

In the context of this invention, the term 'remaining time span' is the predicted time until the content of the ladle is transferred from the ladle into the tundish. In further examples of the invention, the remaining time span can be updated regularly, for example periodically, which advantageously improves the accuracy of the determination. Also, information in regard to the remaining time span might be available and used for the purpose of other process decisions, such as ladle change.

Also, the determination whether the forecast time instance is within the determined time span can be done once or regularly, for example, following an update of the remaining time span. The results of the determination can then be presented to the operator. For example, the results can be displayed on a screen located in a control room of the steel plant.

In further examples, obtaining a remaining time span comprises:
determining the remaining time span based on a current casting flow, and/or an amount of molten steel in the ladle, preferably the amount of molten steel in the ladle is determined by determining the weight of the molten steel in the ladle, and/or obtaining empirically determined time values for the remaining time span.

The remaining time span can be determined before the casting process starts or at the beginning of the casting process by measuring/estimating the casting flow and/or weighting or estimating the amount of molten steel in the ladle. Empirically determined time values can be looked up that correspond to the determined casting flow and to the determined amount of molten steel.

The amount of molten steel in the ladle can be determined by determining the weight of the molten steel in the ladle. For example, the ladle can be equipped with a scale to accurately determine the amount of molten steel in the ladle. Advantageously, the amount of molten steel can be exactly determined and the determination can be repeated multiple times, or can be made continuously. However, in most cases, information in regard to the amount of molten steel in the ladle should be already known, because the relevant information is already used as input for determining ladle changes.

In a further example, the predicting is based on the determined superheat temperature values, and on predicted superheat temperature values corresponding to an expected superheat value at an end time of the remaining time span. Predicting the superheat temperature values corresponding to the expected superheat value at a predicted end time of the remaining time span can comprise:
predicting as a linear function of the determined superheat values, or
predicting as a quadratic evolution of the determined superheat values.

Predicting the superheat temperature values can be done by determining the actual slope of the superheat versus time slope. The remaining time span, $t_{End\ Predicted}$, can be calculated by the equation:

$$t_{End\ Predicted}=(T_{SH}-T_{SH\ Critical})/\text{slope}$$

$T_{SH}$ refers to the determined superheat temperature values and $T_{SH\ Critical}$ refers to the critical superheat temperature values. This linear method will often predict a time at the high side, however when the prediction is updated continuously the prediction becomes more accurate over time. In most cases, the linear prediction system works well enough, but higher order prediction models give more accurate results. The slope can be calculated based on different time intervals. A small time interval will most likely generate more noise in the prediction values, while a higher time interval might generate an overestimate of the remaining time for safe casting. Best results are obtained with a time-interval setting between 5 and 30 minutes for castings with a high ladle-to-ladle time and 5 to 15 minutes for fast casters with a short ladle-to-ladle time. The preference for slope calculation is approximately 5 minutes and preferably the calculation start from a smoothed superheat value array.

More accurate predictions can be obtained form least squares calculations based on second order equations. The time-interval used as input for this calculation can be the time-interval that is also used in the linear method. The least square method minimizes the effect of additional trace smoothing. Solving this equation generates an array of predicted superheat temperature values. Afterwards, the time when the predicted superheat temperature values equals the critical superheat temperature value can be determined.

In another example, the critical superheat value is an empirically determined value. The 'critical superheat temperature' can be a value linked to the caster and the grade cast. These values are known to the operators of the caster installation and are often a result of experience. Critical superheat temperature values are mostly in the range of 5° C. to 15° C. Casters with high throughput often work at the lower end of this range while casters with low throughput tend to work at the higher end of the range.

In another example, determining superheat temperature values corresponding to the measured temperature values starts (i) after a minimum of 20%, preferably after at least 30% of the initial amount of molten steel was transferred from the ladle in the tundish; and/or (ii) after a maximum temperature in the measured temperature values was detected.

Depending on the circumstances the temperature evolution of the molten steel can be fairly linear over time, but can also be variable. In general, the temperature has a tendency to drop towards the end of a predicted ladle change time. Once the ladle change had taken place, a temperature increase is often observed. After a short time, i.e. when a minimum of 20% of the molten steel was transferred from the ladle into the tundish, the temperature evolution starts to show a more linear behavior.

Advantageously, a more accurate prediction can be obtained when the determining superheat temperature values starts after a minimum of 20% of the initial amount of molten steel was transferred from the ladle into the tundish, and/or after a maximum temperature in the measured temperature values was detected.

In yet another example, measuring temperature values comprises measuring at least three, preferably at least five, most preferably continuously temperatures at different time instances to generate a function of temperature over time.

Advantageously, by taking several temperature measurements, the superheat can be calculated more precisely. The temperature measurements can be determined by means of continuous temperature measurements, for example by installing a sensor through the wall of the tundish at a position close to the casting position.

Also, the method can further comprise applying a smoothing function to the function of temperature over time.

Advantageously, applying a smoothening function, for example by means of a software algorithm, reduces the impact of short term fluctuation in the measured temperature values on the resulting prediction.

In another example, the liquidus temperature is determined based on an analysis of a steel composition of the molten steel, and/or based on a general grade composition and/or based on an in situ measurement, and/or based on an analysis of a steel composition from a previous steel treatment process, preferably from a most previous steel treatment process.

For example, the liquidus temperature can be determined by means of a calculation. This calculation can be based on the composition linked to the steel grade in the tundish or can be based on the analysis of a sample of the steel. Alternatively, the liquidus temperature can be also determined by means of a device designed for a corresponding measurement. Advantageously, the results will be available faster than in case of an analysis of the sample and are considered the most reliable.

Also, if the liquidus temperature is determined based on an analysis of the steel composition from a previous steel treatment process, a value for the liquidus temperature can be made available even before the continuous steel casting process starts. In most cases the steel composition of the most previous continuous steel casting process will be very similar to the present steel composition.

In another example, measuring temperature values of the molten steel comprises measuring temperature values of the molten steel near the exit nozzle of the tundish.

Advantageously, very accurate values can be obtained when the temperature is measured near the exit nozzle of the tundish. This can be done by means of a continuous temperature measuring device that can be built-in through the bottom or the wall of the tundish. Measuring the temperature in other locations could result in inaccurate measurements, and could lead to slow response times, which can adversely affect the later superheat calculation.

In yet another example, measuring temperature of the molten steel comprises measuring the temperature of the molten steel by means of a temperature measuring device, preferably a thermocouple, mounted through the side-wall or the bottom portion of the tundish.

A thermocouple mounted through the side-wall or the bottom portion allows continuous temperature measurements throughout the continuous steel casting process, a fast response time, and improved safety for the operator, because the operator is not exposed to the molten steel. Also, in one example, the temperature values can be transmitted wirelessly making wiring redundant.

In another example, the time period is a time period of at least 5 minutes. Advantageously, it has be found that predicting the forecast time instance when the critical superheat temperature value is reached works best when temperature values of the molten steel are measured over a time period of at least 5 minutes.

In one example, the predicting of the forecast time interval is performed after:

(i) a new temperature value of the molten steel was measured, and/or (ii) acquiring a new critical superheat temperature of the molten steel, and/or (iii) determining the remaining time span.

In another example, the method steps are performed in real-time.

The method according to the invention can be, for example, executed on a processor in real-time, wherein the term 'real-time' is used herein to refer to responses to be in the order of milliseconds, and sometimes microseconds. Advantageously, the prediction can be made more accurate when the method steps are executed in real-time. However, in further examples, the method steps can be also performed in non-real time, where the method steps are performed once a second, once a minute, or in even greater time intervals.

The invention also relates to an apparatus for monitoring a continuous steel casting process where molten steel is poured from a ladle into a tundish to be transferred through an exit nozzle into a mold, comprising:

means for obtaining a critical superheat temperature value for the molten steel;

means for measuring temperature values of the molten steel over a time period;

means for determining superheat temperature values corresponding to the measured temperature values by comparing the measured temperature values with a liquidus temperature of the molten steel; and means for predicting a forecast time instance when the critical superheat temperature value is reached.

In addition, the invention relates to computer-readable medium comprising a computer program comprising instructions for influencing a processor to carry out the method according to the invention.

BRIEF DESCRIPTION OF THE DRAWINGS

The following schematic drawings show aspects of the invention for improving the understanding of the invention in connection with some exemplary illustrations, wherein.

DETAILED DESCRIPTION

Figure 1:
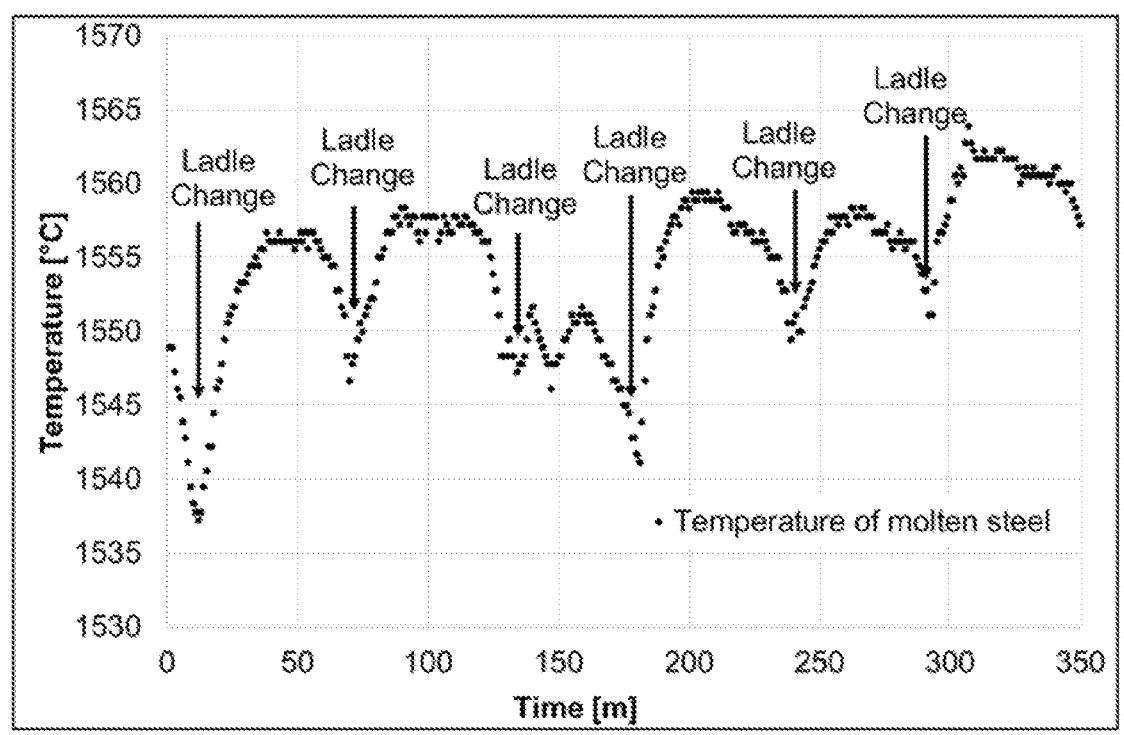
FIG. 1 shows an evolution of a tundish temperature over a casting process where several ladles of molten steel are subsequently poured into the tundish.

FIG. 1 shows an evolution of a tundish temperature over a casting process where several ladles of molten steel are subsequently poured into the tundish. In total, six ladle changes are exemplarily shown in FIG. 1. It can be seen that the evolution of the temperature and the time to cast can vary from ladle to ladle. In addition, it can be seen that towards the end of the ladle, a steep drop in temperature takes place. In the shown example, a liquidus temperature of 1529° C. was calculated. As it can be seen from FIG. 1, the measured temperature of the molten steel almost dropped to the level of the liquidus temperature during the first and fourth ladle change. Therefore, determining superheat values and predicting based on the determined temperature values a forecast time instance when the critical superheat temperature is reached can be very beneficial for monitoring a continuous steel casting process.

Figure 2:
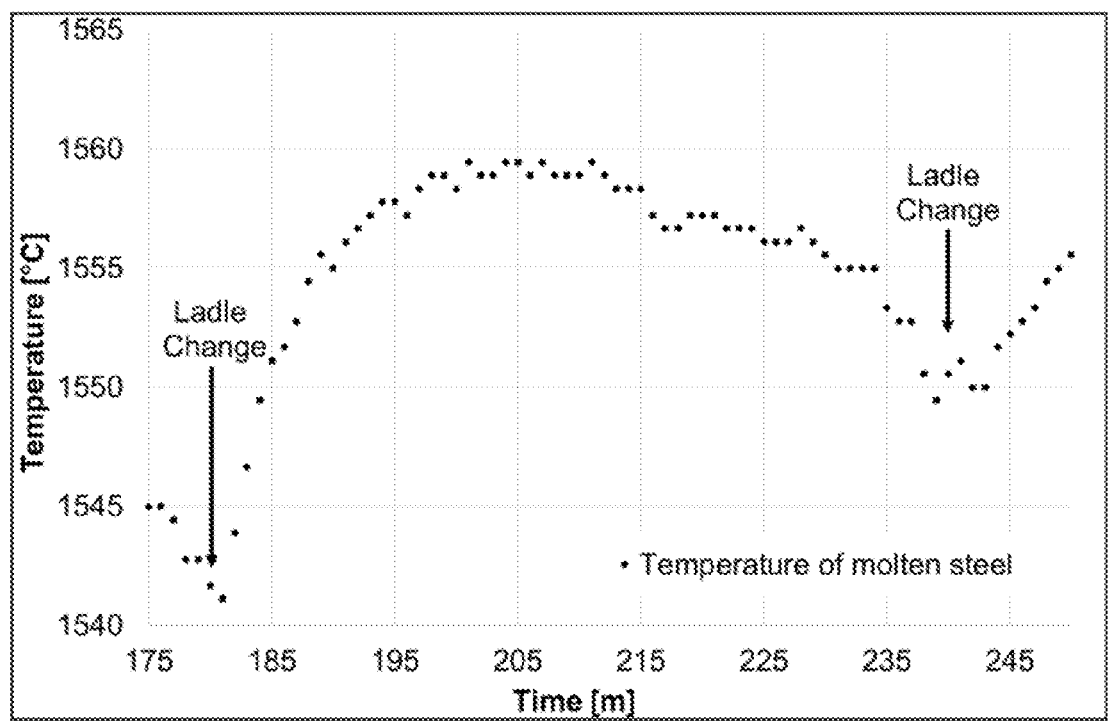
FIG. 2 shows a detailed view of the tundish temperature where a single ladle of molten steel is poured into the tundish.

FIG. 2 shows a detailed view of the tundish temperature where a single ladle of molten steel is poured into the tundish. FIG. 2 can be a detailed view of the evolution of the tundish temperature which corresponds to the measured temperature $T_{Meas}$ over one ladle of the casting process which is shown in FIG. 1. In the shown example, the ladle-to-ladle time is 59 minutes. However, the skilled person would know that the ladle-to-ladle time could be shorter or longer depending on the process.

In general, the evolution of the tundish temperature does not follow a linear pattern, since the temperature has a tendency to drop after a short and steep increase almost linearly towards the end of a predicted ladle change time. The figure shows that after a short time, i.e. when a minimum of 20% to 30% of the molten steel was transferred from the ladle into the tundish, the temperature evolution starts to show a more linear behavior. Therefore, it is meaningful to determine superheat temperature values corresponding to the measured temperature values after a minimum of 20% of the initial amount of molten steel was transferred from the ladle into the tundish, and/or after a maximum temperature in the measured temperature values was detected.

Figure 3:
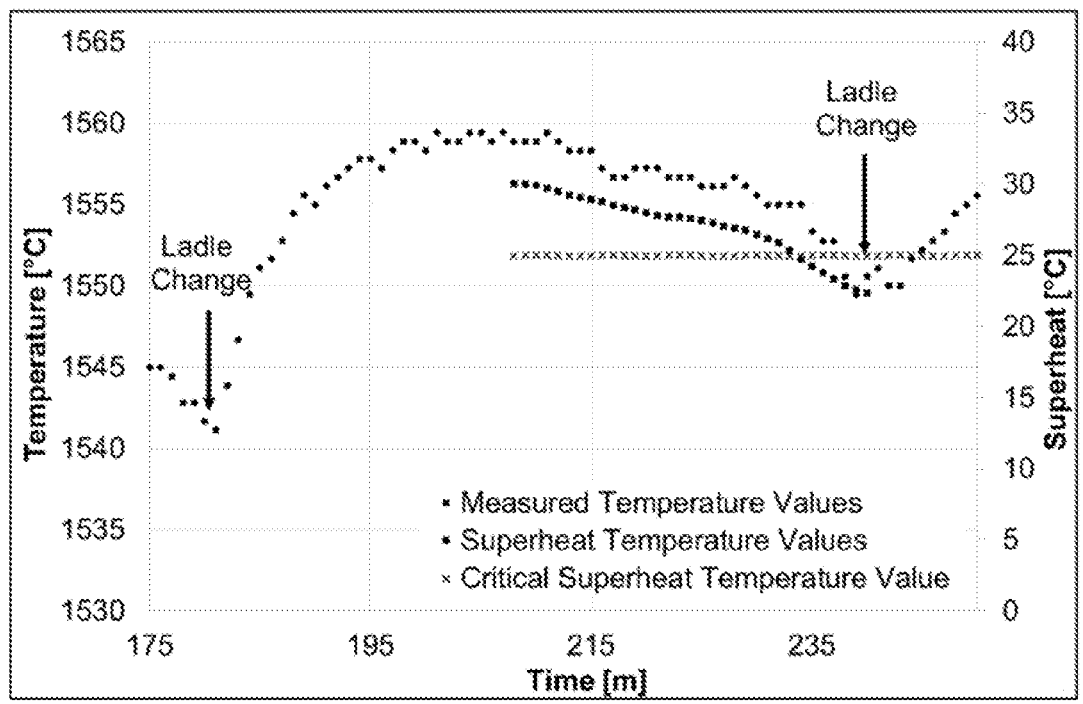
FIG. 3 shows the determined superheat temperature values corresponding to measured temperature values according to an embodiment of the invention.

FIG. 3 shows the determined superheat temperature values $T_{SH}$ corresponding to measured temperature values $T_{Meas}$ according to an embodiment of the invention. The measured temperature values $T_{Meas}$ of the molten steel that are shown using circles can be those of FIG. 2. In the shown embodiment one new temperature value is obtained per minute. Also, in the shown embodiment for determining the superheat temperature values $T_{SH}$ a smoothing function (which is not shown in FIG. 3) is applied to the function of temperature over time. However, in other embodiments no smoothing function might be applied, and the sampling time might be faster or slower than one temperature value per minute.

As discussed above, the step of comparing the measured temperature values $T_{Meas}$ with a liquidus temperature of the molten steel to determine superheat temperature values $T_{SH}$ corresponding to the measured temperature values $T_{Meas}$ starts when a minimum of 20% to 30% of the molten steel was transferred from the ladle into the tundish. The determined superheat temperature values $T_{SH}$ corresponding to the measured temperature values $T_{Meas}$ are shown using squares. For the purpose of the present discussion, the critical superheat temperature value $T_{SH}$ Critical was set to be 25° C. and is shown using crosses.

In the shown embodiment, the critical superheat temperature value $T_{SH\ Critical}$ was determined only once for the process. However, in other embodiments the critical superheat temperature can be updated regularly or irregularly during the process.

Figure 4:
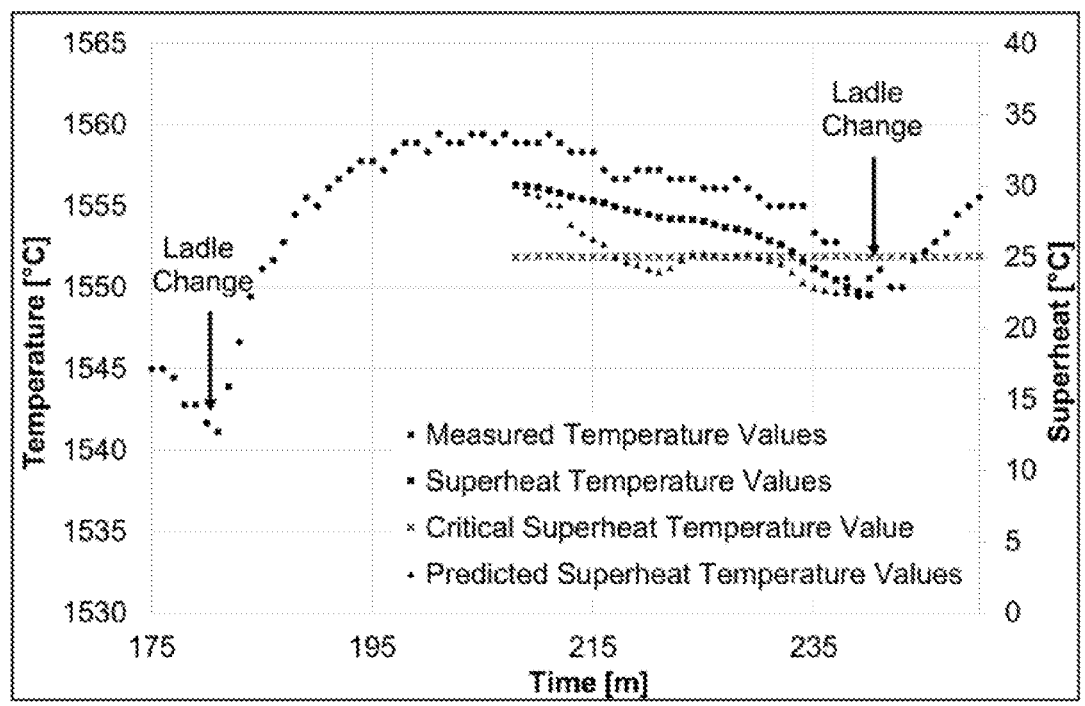
FIG. 4 shows the evolution of a predicted superheat temperature over time according to an embodiment of the invention.

FIG. 4 shows the evolution of a predicted superheat temperature $T_{SH\ Predicted}$ over time according to an embodiment of the invention. The determined superheat temperature values $T_{SH}$ and measured temperature values $T_{Meas}$ can be those which are shown in FIG. 3. Hence, FIG. 4 and FIG. 3 can relate to the same embodiment.

In the shown embodiment, the predicted superheat temperature values $T_{SH\ Predicted}$ are calculated as a quadratic evolution of the determined superheat temperature values $T_{SH}$. The predicted superheat temperature values $T_{SH\ Predicted}$ correspond to an expected superheat value at the predicted end time $t_{End\ Predicted}$ of the process or to the time instance of the next ladle-change.

Figure 5:
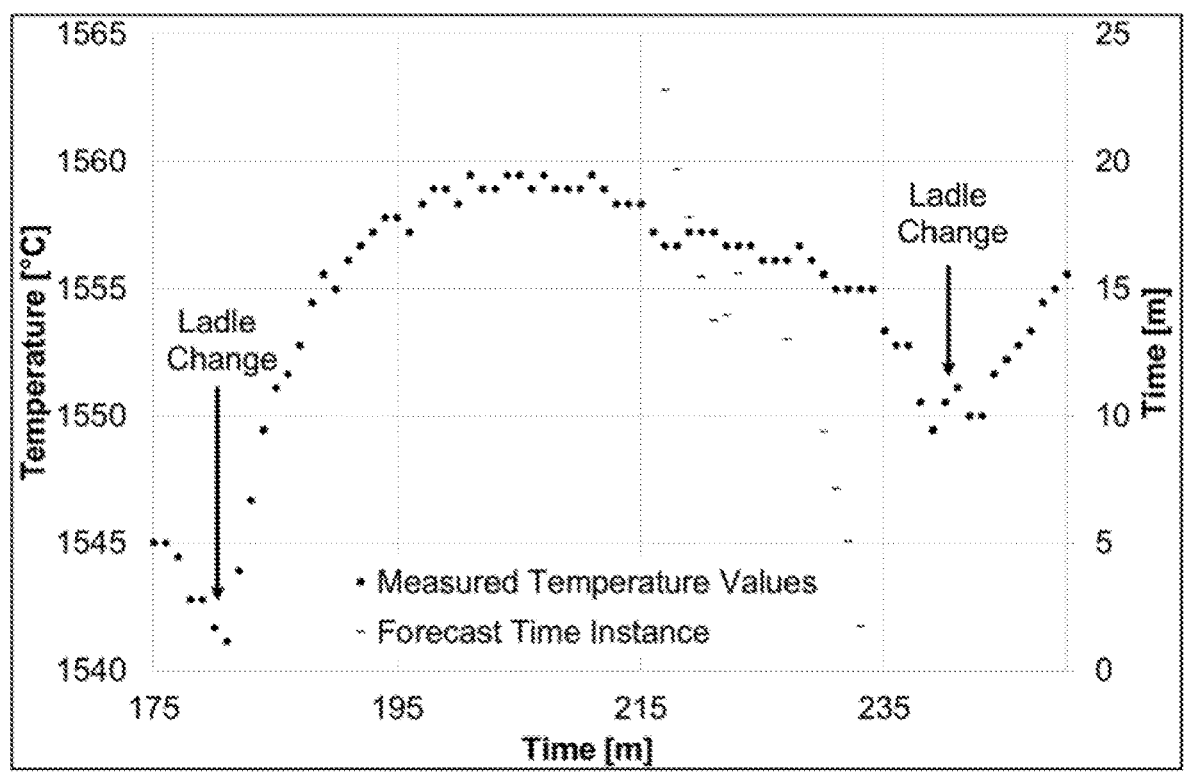
FIG. 5 shows the predicting of a forecast time instance according to an embodiment of the invention.

FIG. 5 shows the predicting of a forecast time instance $t_{Forecast}$ according to an embodiment of the invention. The determined superheat temperature values $T_{SH}$, predicted superheat temperature values $T_{SH\ Predicted}$, and measured temperature values $T_{Meas}$ can be those of the embodiment of FIGS. 3 and 4. Hence, FIGS. 3, 4 and 5 can all relate to the same embodiment.

In FIG. 5 the forecast time instance $t_{Forecast}$ is predicted dynamically every minute following the determination of a new superheat temperature value $T_{SH}$. The forecast time instances $t_{Forecast}$ are shown as lines and refer to the remaining time for casting, i.e. to the predicted time when the critical superheat temperature value $T_{SH}$ Critical is reached.

The forecast time instance $t_{Forecast}$ can be calculated by the equation:

$$t_{Forecast} = (T_{SH} - T_{SH\ Critical}) / ((T_{SH} - T_{SH\ Predicted}) / (t_{End\ Predicted} - t_{Actual}))$$

The remaining time span $t_{End\ Predicted}$ is a prediction of the time when the process ends or the next ladle change occurs. The actual time $t_{Actual}$ corresponds to the time instance when the forecast time instance $t_{Forecast}$ is calculated.

Figure 6:
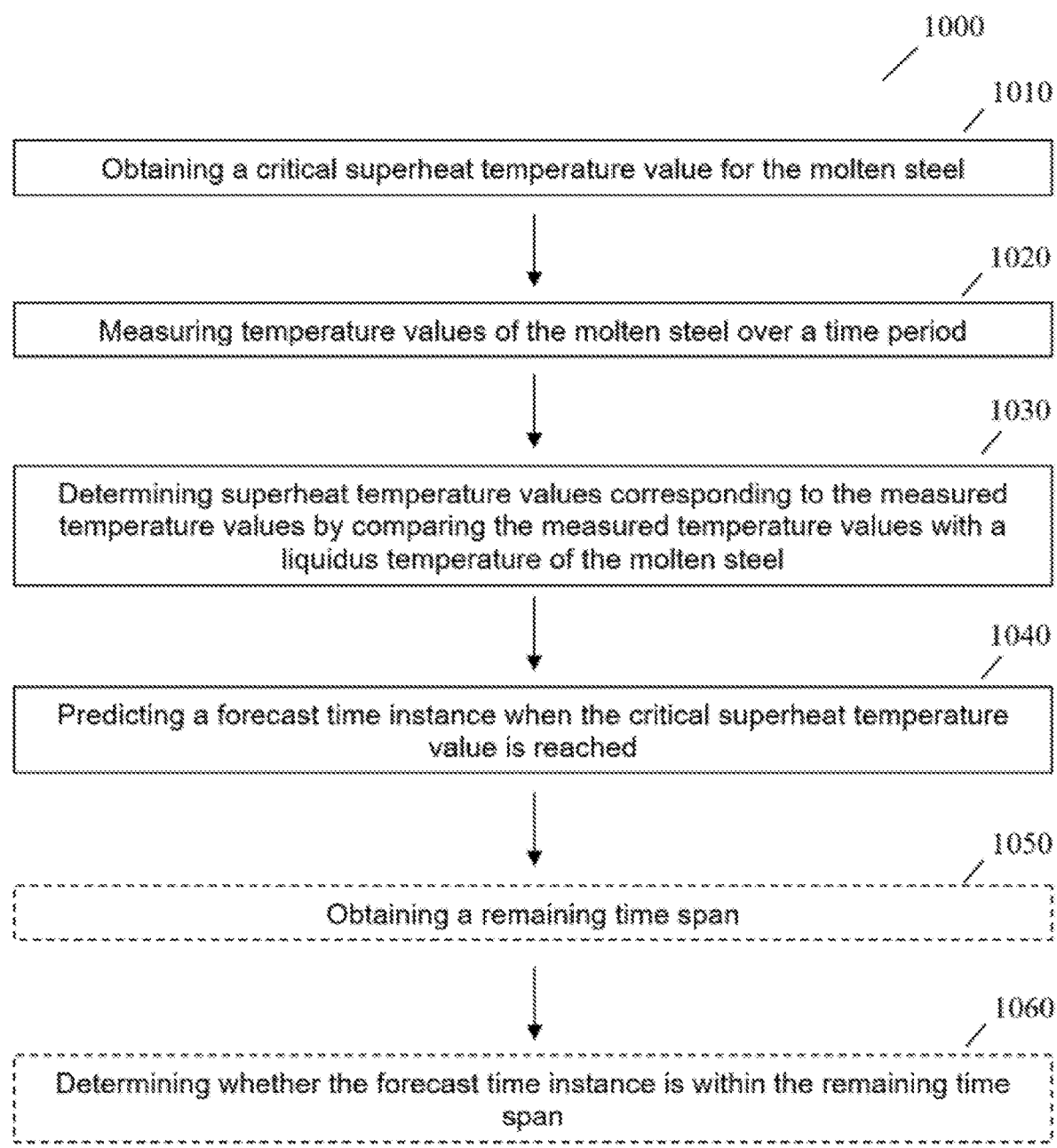
FIG. 6 shows the method steps of the method according to an embodiment of the invention.

FIG. 6 shows the method steps of the method 1000 for monitoring a continuous steel casting process where molten steel is poured from a ladle into a tundish to be transferred through an exit nozzle into a mold according to an embodiment of the invention. The method 1000 comprises the steps:

obtaining 1010 a critical superheat temperature value for the molten steel;

measuring 1020 temperature values of the molten steel over a time period;

determining 1030 superheat temperature values corresponding to the measured temperature values by comparing the measured temperature values with a liquidus temperature of the molten steel; and predicting 1040 a forecast time instance when the critical superheat temperature value is reached.

Optionally, the method 1000 can comprise the steps:

obtaining 1050 a remaining time span for casting; and determining 1060 whether the forecast time instance is within the remaining time span.

Figure 7:
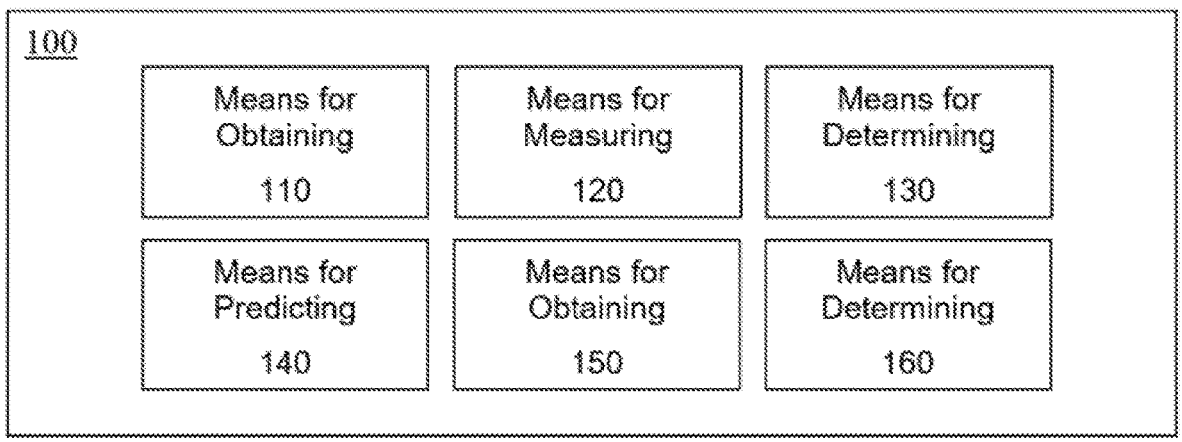
FIG. 7 shows a schematic view of an apparatus according to an embodiment of the invention.

FIG. 7 shows a schematic view of an apparatus 100 for monitoring a continuous steel casting process where molten steel is poured from a ladle into a tundish to be transferred through an exit nozzle into a mold according to an embodiment of the invention. The apparatus 100 comprises:

means for obtaining 110 a critical superheat temperature value for the molten steel;

means for measuring 120 temperature values of the molten steel over a time period;

means for determining 130 superheat temperature values corresponding to the measured temperature values by comparing the measured temperature values with a liquidus temperature of the molten steel; and means for predicting 140 a forecast time instance when the critical superheat temperature value is reached.

Optionally, the apparatus 100 can also comprise:

means for obtaining 150 a remaining time span for casting; and means for determining 160 whether the forecast time instance is within the remaining time span.

The features disclosed in the claims, the specification, and the drawings may be essential for different embodiments of the claimed invention, both separately or in any combination with each other.

REFERENCE SIGNS

100 Apparatus for Monitoring
110 Means for Determining a Critical Superheat Temperature Value
120 Means for Measuring Temperature Values
130 Means for Determining Superheat Temperature Values
140 Means for Predicting
150 Means for Obtaining a Remaining Time Span
160 Means for Determining whether the Forecast Time Instance is within the Remaining Time Span
1000 Method for Monitoring
1010 Determining a Critical Superheat Temperature Value
1020 Measuring Temperature Values
1030 Determining Superheat Temperature Values
1040 Predicting
1050 Obtaining a Remaining Time Span
1060 Determining whether the Forecast Time Instance is within the Remaining Time Span
$T_{SH}$ Determined Superheat Temperature Values
$T_{SH\ Predicted}$ Predicted Superheat Temperature Values
$T_{Meas}$ Measured Temperature Values
$T_{SH\ Critical}$ Critical Superheat Temperature Value
$t_{Actual}$ Actual Time
$t_{End\ Predicted}$ Predicted End Time
$t_{Forecast}$ Forecast Time Instance

The invention claimed is:

1. A method for monitoring a continuous steel casting process where molten steel is poured from a ladle into a tundish to be transferred through an exit nozzle into a mold, the method comprising:

obtaining a critical superheat temperature value for the molten steel;

measuring temperature values of the molten steel over a time period;

determining superheat temperature values corresponding to the measured temperature values by comparing the measured temperature values with a liquidus temperature of the molten steel;

predicting a forecast time instance ($t_{Forecast}$) when the critical superheat temperature value is reached, wherein $$t_{Forecast} = (T_{SH} - T_{SH\ Critical}) / ((T_{SH} - T_{SH\ Predicted}) / (t_{End\ Predicted} - t_{Actual}))$$

where $T_{SH}$ represents the determined superheat temperature, $T_{SH\ Critical}$ represents the critical superheat temperature, $T_{SH\ Predicted}$ represents the predicted superheat temperature, $t_{End\ Predicted}$ represents the remaining time span and $t_{Actual}$ represents the time instance when the forecast time instance $t_{Forecast}$ is calculated, wherein predicting the superheat temperature is performed by determining the actual slope of the superheat versus time slope;

obtaining a remaining time span for casting which is the predicted time until the molten steel is transferred from the ladle into the tundish; and determining whether the forecast time instance is within the remaining time span.

2. The method of claim 1, wherein obtaining the remaining time span comprises:

determining the remaining time span based on a current casting flow, and/or an amount of molten steel in the ladle, and/or obtaining empirically determined time values for the remaining time span.

3. The method of claim 2, wherein the amount of molten steel in the ladle is determined by determining the weight of the molten steel in the ladle.

4. The method of claim 1, wherein the predicting the forecast time instance when the critical superheat temperature value is reached is based on the determined superheat temperature values, and on predicted superheat temperature values corresponding to an expected superheat value at an end time of the remaining time span.

5. The method of claim 4, wherein predicting the superheat temperature values corresponding to the expected superheat value at a predicted end time of the remaining time span comprises:

predicting as a linear function of the determined superheat values.

6. The method of claim 4, wherein predicting the superheat temperature values corresponding to the expected superheat value at a predicted end time of the remaining time span comprises predicting as a quadratic evolution of the determined superheat values.

7. The method of claim 1, wherein the critical superheat value is an empirically determined value.

8. The method of claim 1, wherein determining superheat temperature values corresponding to the measured temperature values starts (i) after a minimum of 20% of the initial amount of molten steel was transferred from the ladle in the tundish; and/or (ii) after a maximum temperature in the measured temperature values was detected.

9. The method of claim 1, wherein measuring temperature values comprises measuring at least three temperatures at different time instances to generate a function of temperature over time.

10. The method of claim 9, further comprising applying a smoothing function to the function of temperature over time.

11. The method of claim 1, wherein the liquidus temperature is determined based on an analysis of a steel composition of the molten steel, and/or based on a general grade composition and/or based on an in situ measurement, and/or based on an analysis of a steel composition from a previous steel treatment process.

12. The method of claim 1, wherein measuring the temperature values of the molten steel comprises measuring the temperature of the molten steel by means of a temperature measuring device mounted through a side-wall or bottom portion of the tundish.

13. The method of claim 1, wherein the time period is a time period of at least 5 minutes.

14. The method of claim 1, wherein the predicting of the forecast time instance is performed after:
(i) a new temperature value of the molten steel was measured, and/or
(ii) acquiring a new critical superheat temperature of the molten steel, and/or
(iii) determining the remaining time span.

15. The method of claim 1, wherein the method steps are performed in real-time.

16. The method of claim 1, wherein determining superheat temperature values corresponding to the measured temperature values starts
(i) after at least 30% of the initial amount of molten steel was transferred from the ladle in the tundish; and/or
(ii) after a maximum temperature in the measured temperature values was detected.

17. The method of claim 1, wherein measuring temperature values comprises measuring continuously to generate a function of temperature over time.

18. A computer-readable medium comprising a computer program comprising instructions for influencing a processor to carry out a method according to claim 1.

19. An apparatus for monitoring a continuous steel casting process where molten steel is poured from a ladle into a tundish to be transferred through an exit nozzle into a mold, the apparatus comprising:
means for obtaining a critical superheat temperature value for the molten steel;
means for measuring temperature values of the molten steel over a time period;
means for determining superheat temperature values corresponding to the measured temperature values by comparing the measured temperature values with a liquidus temperature of the molten steel; and
means for predicting a forecast time instance ($t_{Forecast}$) when the critical superheat temperature value is reached, wherein $t_{Forecast} = (T_{SH} - T_{SH\ Critical})/((T_{SH} - T_{SH\ Predicted})/(t_{End\ Predicted} - t_{Actual}))$ where $T_{SH}$ represents the determined superheat temperature, $T_{SH\ Critical}$ represents the critical superheat temperature, $T_{SH\ Predicted}$ represents the predicted superheat temperature, $t_{End\ Predicted}$ represents the remaining time span and $t_{Actual}$ represents to the time instance when the forecast time instance $t_{Forecast}$ is calculated, wherein predicting the superheat temperature to obtain $T_{SH\ Predicted}$ is performed by determining the actual slope of the superheat versus time slope;
means for obtaining a remaining time span for casting which is the predicted time until the molten steel is transferred from the ladle into the tundish; and
means for determining whether the forecast time instance is within the remaining time span.

* * * * *